US010635473B2

(12) United States Patent
Furuhashi et al.

(10) Patent No.: US 10,635,473 B2
(45) Date of Patent: Apr. 28, 2020

(54) SETTING SUPPORT PROGRAM, SETTING SUPPORT METHOD, AND SETTING SUPPORT DEVICE

(71) Applicant: FUJITSU LIMITED, Kawasaki-shi, Kanagawa (JP)

(72) Inventors: Masaki Furuhashi, Nagoya (JP); Shinichirou Yamaguchi, Gifu (JP); Kazunari Fujita, Nagoya (JP); Kazuaki Kozawa, Hekinan (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 15/480,498

(22) Filed: Apr. 6, 2017

(65) Prior Publication Data

US 2017/0322826 A1   Nov. 9, 2017

(30) Foreign Application Priority Data

May 6, 2016   (JP) .................................. 2016-092970

(51) Int. Cl.
*G06F 9/445*   (2018.01)
*G06F 9/455*   (2018.01)
(Continued)

(52) U.S. Cl.
CPC ........ *G06F 9/45558* (2013.01); *G06F 11/301* (2013.01); *G06F 11/3006* (2013.01);
(Continued)

(58) Field of Classification Search
CPC .................................................. G06F 9/45533
(Continued)

(56) References Cited

U.S. PATENT DOCUMENTS 8,219,653 B1 *   7/2012   Keagy ....................... G06F 8/63
                                                     709/222
8,990,813 B2 *   3/2015   Frields ................ G06F 11/3672
                                                     709/223
(Continued)

FOREIGN PATENT DOCUMENTS

JP   2002-222097 A   8/2002
JP   2008-299387     12/2008
(Continued)

OTHER PUBLICATIONS

Japanese Office Action dated Nov. 19, 2019 for corresponding Japanese Patent Application No. 2016-092970, with English Translation. 7 pages.

*Primary Examiner* — Francisco J Aponte
(74) *Attorney, Agent, or Firm* — Fujitsu Patent Center

(57) ABSTRACT

A setting support program related to monitoring of a system causes a computer to execute a process including (1) receiving an input of first system information including a first configuration element group of a first system, (2) referring to a storage unit that stores a second configuration element group of a second system and setting information related to monitoring of the second system for a plurality of the second systems to identify setting information related to the monitoring of the second system corresponding to the second configuration element group having predetermined similarity to the first configuration element group included in the first system information, and (3) outputting the identified setting information as setting information of the first system.

8 Claims, 16 Drawing Sheets

(51) Int. Cl.
*G06F 11/34* (2006.01)
*G06F 11/30* (2006.01)

(52) U.S. Cl.
CPC ...... *G06F 11/3051* (2013.01); *G06F 11/3093* (2013.01); *G06F 11/3433* (2013.01); *G06F 11/3457* (2013.01); *G06F 2009/4557* (2013.01); *G06F 2009/45591* (2013.01); *G06F 2201/815* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 9,058,194 B2* | 6/2015 | Murray | ............... | G06F 9/45533 |
| 9,069,890 B2* | 6/2015 | Kaiser | ............... | G06F 11/3442 |
| 9,203,855 B1* | 12/2015 | Mooring | ............... | G06F 9/45558 |
| 9,495,197 B2* | 11/2016 | Karve | ............... | G06F 9/455 |
| 9,875,129 B2* | 1/2018 | Murray | ............... | G06F 9/45533 |
| 10,234,921 B2* | 3/2019 | Neilson | ............... | G06F 1/28 |
| 2005/0081218 A1* | 4/2005 | Acott | ............... | G06F 11/3664 |
| | | | | 719/328 |
| 2008/0301763 A1 | 12/2008 | Sasaki et al. | | |
| 2009/0198814 A1 | 8/2009 | Oono et al. | | |
| 2010/0100880 A1* | 4/2010 | Shigeta | ............... | G06F 11/3696 |
| | | | | 718/1 |
| 2010/0100881 A1* | 4/2010 | Shigeta | ............... | G06F 11/2247 |
| | | | | 718/1 |
| 2010/0115342 A1 | 5/2010 | Shigeta et al. | | |
| 2012/0209586 A1* | 8/2012 | Mieritz | ............... | G06F 9/455 |
| | | | | 703/22 |
| 2014/0201732 A1* | 7/2014 | Haag | ............... | G06F 9/45533 |
| | | | | 718/1 |
| 2015/0007176 A1* | 1/2015 | Kotani | ............... | G06F 9/45533 |
| | | | | 718/1 |
| 2015/0378763 A1* | 12/2015 | Hassine | ............... | G06F 9/45558 |
| | | | | 718/1 |
| 2016/0019085 A1* | 1/2016 | Khandekar | ............... | G06F 9/45558 |
| | | | | 718/1 |
| 2016/0034293 A1* | 2/2016 | Cao | ............... | G06F 9/45558 |
| | | | | 718/1 |
| 2016/0092260 A1* | 3/2016 | Kikuchi | ............... | G06F 9/45558 |
| | | | | 718/1 |
| 2016/0162317 A1* | 6/2016 | Doherty | ............... | G06F 11/30 |
| | | | | 718/1 |

FOREIGN PATENT DOCUMENTS

| | | |
|---|---|---|
| JP | 2010-113381 | 5/2010 |
| JP | 2013-164734 | 8/2013 |
| WO | 2007/142053 A1 | 12/2007 |

\* cited by examiner

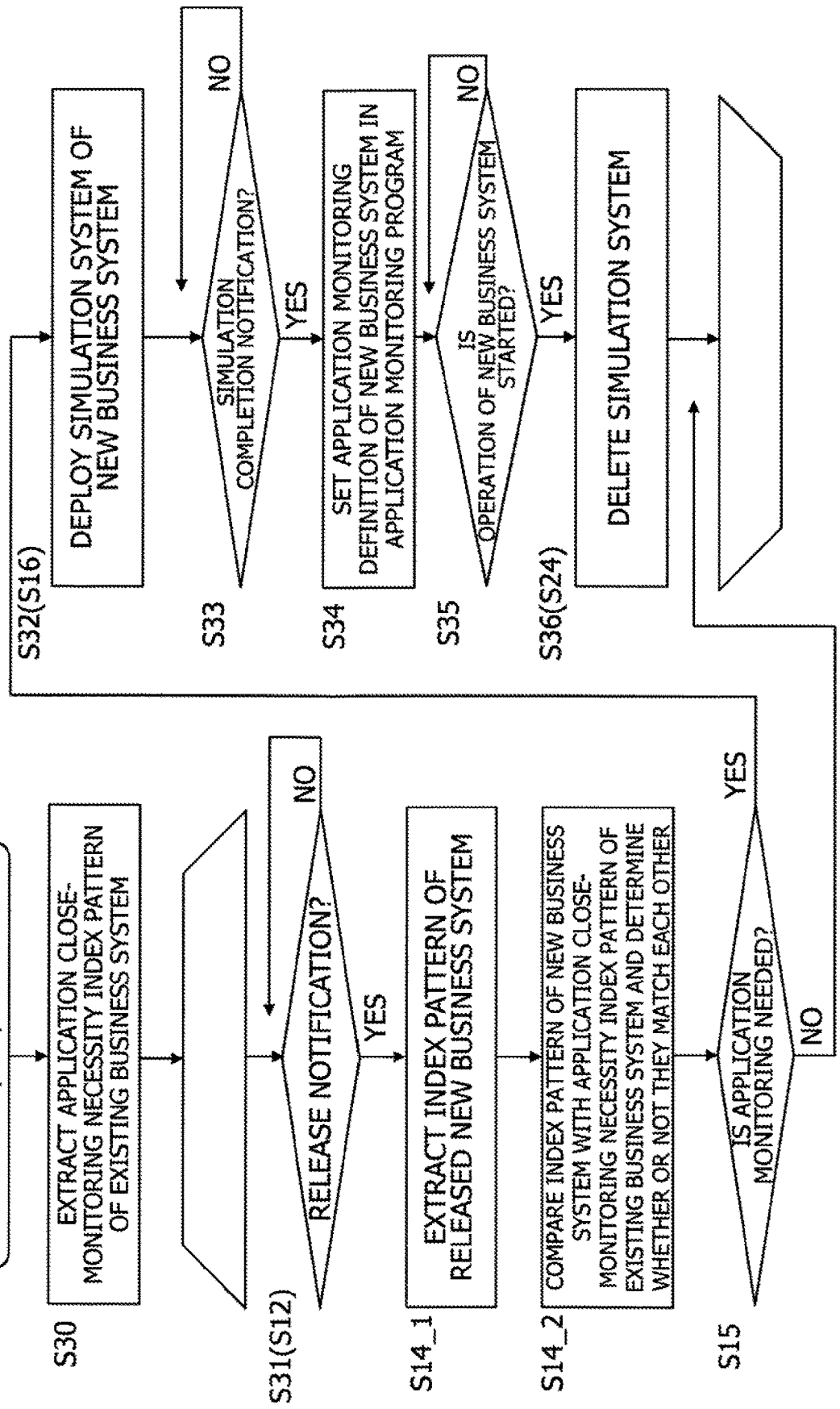

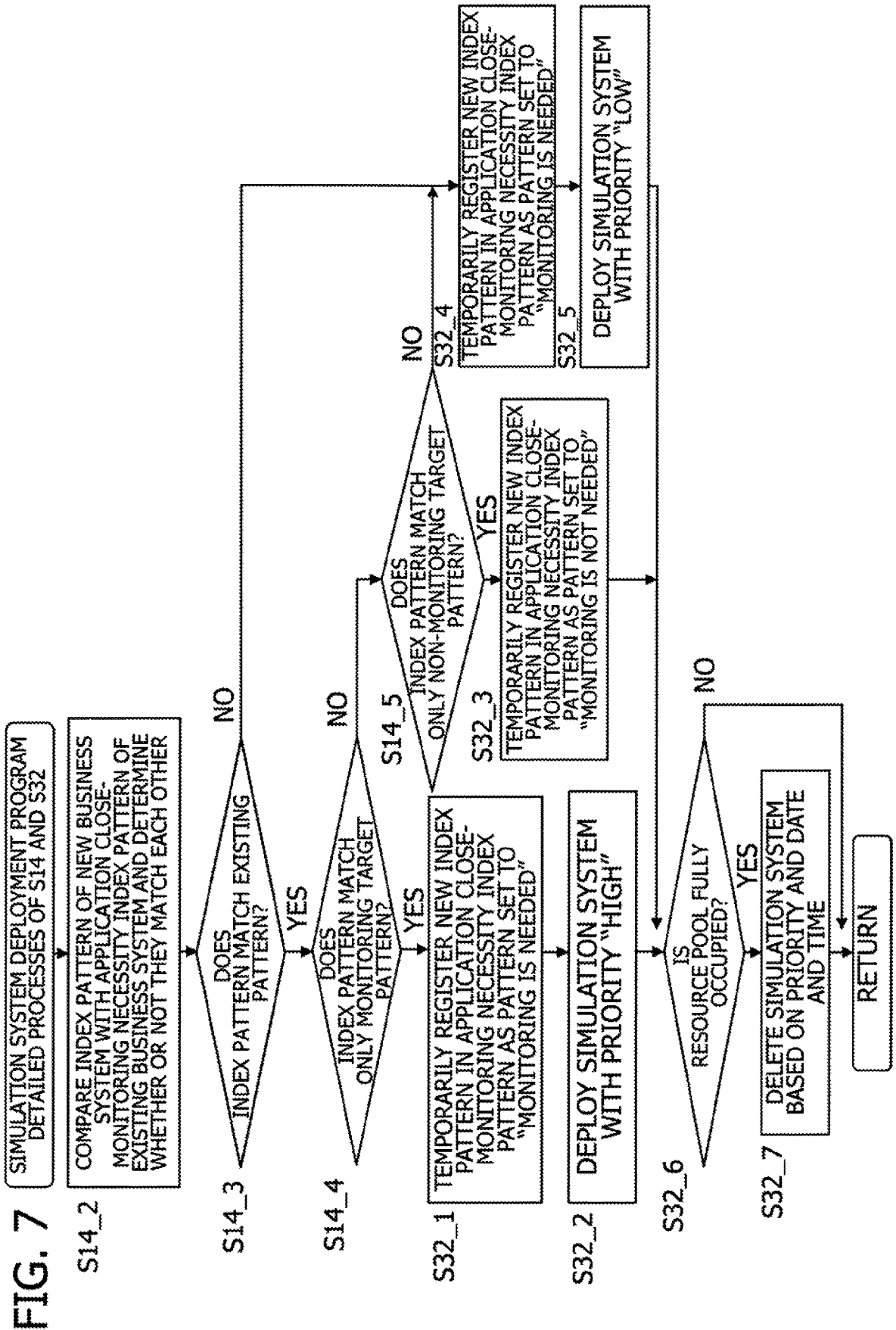

FIG. 8

| No. | TYPE | INDEX (ELEMENT) NAME | OUTLINE |
|---|---|---|---|
| a | CONFIGURATION FACTOR (PRESENCE OR ABSENCE OF ELEMENT) | HAVE LOAD BALANCER AT FRONT OF Web SERVER | PRESENCE OR ABSENCE OF INSTALLED LOAD BALANCER FOR IMPROVING RESPONSE WHEN Web SERVER PASSES REQUEST RECEIVED FROM OUTSIDE TO BUSINESS SERVICE SYSTEM |
| b | | HAVE Firewall AT FRONT OF Web SERVER | PRESENCE OR ABSENCE OF INSTALLED Firewall FOR PROTECTING BUSINESS SERVICE SYSTEM WHEN Web SERVER CONVEYS REQUEST RECEIVED FROM OUTSIDE TO BUSINESS SERVICE SYSTEM |
| c | | BOTH OF Read AND Write FROM AND TO DB SERVER OR ONLY Read | ACCESS FROM BUSINESS TO DB SERVER INCLUDES BOTH OF Read AND Write OR ONLY Read (Write TO DB IS PERFORMED FREQUENTLY IN CASE OF BACKBONE SYSTEM. ONLY Read IS PERFORMED WHEN INFORMATION COLLECTION IS PERFORMED AS MONTHLY PROCESS) |
| d | | HAVE DISASTER COUNTERMEASURE OPTION | FUNCTION OF CONTINUING BUSINESS SERVICE IN ANOTHER ENVIRONMENT WHEN DISASTER OCCURS |
| e | | BUSINESS SYSTEM IS DUPLICATED WITH CLUSTER CONFIGURATION | BUSINESS SYSTEM IS DUPLICATED |
| f | PERFORMANCE FACTOR (PERFORMANCE OF ELEMENT) | CPU UTILIZATION RATE | CPU UTILIZATION RATE USED IN BUSINESS EXCEEDS LOWEST VALUE OF BUSINESS SYSTEM OF WHICH APPLICATION CLOSE-MONITORING IS PERFORMED |
| g | | TOTAL MEMORY AMOUNT | MEMORY AMOUNT ASSIGNED TO BUSINESS SYSTEM EXCEEDS LOWEST VALUE OF BUSINESS SYSTEM OF WHICH APPLICATION CLOSE-MONITORING IS PERFORMED |
| h | | BAND SIZE OF COMMUNICATION LINE | BAND SIZE OF COMMUNICATION LINE EXCEEDS LOWEST VALUE OF BUSINESS SYSTEM OF WHICH APPLICATION CLOSE-MONITORING IS PERFORMED |
| i | | AVERAGES OF UTILIZATION AMOUNT AND UTILIZATION RATE OF STORAGE | UTILIZATION AMOUNT AND UTILIZATION RATE OF STORAGE EXCEED LOWEST VALUES OF BUSINESS SYSTEM OF WHICH APPLICATION CLOSE-MONITORING IS PERFORMED |
| j | | NUMBER OF NETWORK INTERFACES | NUMBER OF NETWORK INTERFACES SET IN BUSINESS SYSTEM EXCEEDS LOWEST VALUE OF BUSINESS SYSTEM OF WHICH APPLICATION CLOSE-MONITORING IS PERFORMED |
| k | | LARGE CHANGE OF NUMBER OF PROCESSES FOR RECEIVING REQUEST OF Web SERVER | NUMBER OF PROCESSES PREPARED FOR RECEIVING OUTSIDE REQUEST BY Web SERVER CHANGES TO VALUE OUTSIDE ASSUMED RANGE |

FIG. 9

<ACQUISITION METHOD OF INDEX (ELEMENT)>

| No. | INDEX (ELEMENT) NAME | ACQUISITION METHOD |
|---|---|---|
| a | LOAD BALANCER AT FRONT OF Web SERVER | ACQUIRE WITH INVENTORY INFORMATION COLLECTION COMMAND |
| b | Firewall AT FRONT OF Web SERVER | ACQUIRE WITH INVENTORY INFORMATION COLLECTION COMMAND |
| c | Read AND Write FROM AND TO DB SERVER | ACQUIRE FROM LOGS OF Read AND Write |
| d | DISASTER COUNTERMEASURE OPTION | ACQUIRE OPTION INFORMATION WITH API OF CLOUD SERVICE |
| e | DUPLICATION OF BUSINESS SYSTEM WITH CLUSTER CONFIGURATION | ACQUIRE OPTION INFORMATION WITH API OF CLOUD SERVICE |
| f | CPU UTILIZATION RATE | ACQUIRE FROM OS |
| g | TOTAL MEMORY AMOUNT | ACQUIRE FROM OS |
| h | BAND SIZE OF COMMUNICATION LINE | ACQUIRE FROM OS |
| i | UTILIZATION AMOUNT AND UTILIZATION RATE OF STORAGE | ACQUIRE FROM STORAGE |
| j | NUMBER OF NETWORK INTERFACES | ACQUIRE WITH INVENTORY INFORMATION COLLECTION COMMAND |
| k | LARGE CHANGE OF NUMBER OF PROCESSES FOR RECEIVING REQUEST OF Web SERVER | ACQUIRE WITH PROCESS NUMBER COLLECTION COMMAND |

FIG. 10

| BUSINESS SYSTEM NAME | a | b | c | d | e | f | g | h | i | j | k | APPLICATION CLOSE-MONITORING NECESSITY |
|---|---|---|---|---|---|---|---|---|---|---|---|---|
| BUSINESS SYSTEM 1 |   | O | O |   |   |   |   |   |   |   |   | APPLICATION CLOSE-MONITORING IS NEEDED |
| BUSINESS SYSTEM 2 | O |   |   |   | O |   |   |   |   |   | O | APPLICATION CLOSE-MONITORING IS NEEDED |
| BUSINESS SYSTEM 3 | O |   |   |   | O |   |   |   |   |   | O | APPLICATION CLOSE-MONITORING IS NEEDED |
| BUSINESS SYSTEM 4 | O |   |   |   | O |   |   |   |   |   | O | APPLICATION CLOSE-MONITORING IS NEEDED |
| BUSINESS SYSTEM 5 |   | O | O |   |   |   |   |   |   |   |   | APPLICATION CLOSE-MONITORING IS NOT NEEDED |
| BUSINESS SYSTEM 6 |   |   |   |   |   |   | O | O |   |   |   | APPLICATION CLOSE-MONITORING IS NOT NEEDED |

EXAMPLE IN WHICH BUSINESS SYSTEM IS SUBJECTED TO MONITORING (PRIORITY IS HIGH)
CASE WHERE EACH "MONITORING NECESSITY" OF HIT PATTERN CORRESPONDS TO "MONITORING IS NEEDED"

51

| BUSINESS SYSTEM NAME | a | b | c | d | e | f | g | h | i | j | k | MONITORING NECESSITY |
|---|---|---|---|---|---|---|---|---|---|---|---|---|
| BUSINESS SYSTEM 101 | ○ | | | | ○ | | | | | | ○ | MONITORING IS NEEDED |

EXAMPLE IN WHICH BUSINESS SYSTEM IS SUBJECTED TO MONITORING (PRIORITY IS LOW)
CASE WHERE PART OF "MONITORING NECESSITIES" OF HIT PATTERN CORRESPONDS TO "MONITORING IS NEEDED"

52

| BUSINESS SYSTEM NAME | a | b | c | d | e | F | g | h | i | j | k | MONITORING NECESSITY |
|---|---|---|---|---|---|---|---|---|---|---|---|---|
| BUSINESS SYSTEM 102 | | ○ | ○ | | | | | | | | | MONITORING IS NEEDED |

EXAMPLE IN WHICH BUSINESS SYSTEM IS NOT SUBJECTED TO MONITORING
CASE WHERE EACH "MONITORING NECESSITY" OF HIT PATTERN CORRESPONDS TO "MONITORING IS NOT NEEDED"

53

| BUSINESS SYSTEM NAME | a | b | c | d | e | f | g | h | i | j | k | MONITORING NECESSITY |
|---|---|---|---|---|---|---|---|---|---|---|---|---|
| BUSINESS SYSTEM 103 | | | | | | | ○ | ○ | | | | MONITORING IS NOT NEEDED |

FIG. 12

<SIMULATION SYSTEM DEPLOYMENT MANAGEMENT TABLE>

| SIMULATION VM ID | PRODUCTION VM ID | BUSINESS SYSTEM NAME | RELEASE DATE AND TIME | PRIORITY |
|---|---|---|---|---|
| S000101 | R000101 | BUSINESS SYSTEM 101 | 2015/10/30 11:23:45 | HIGH |
| S000102 | R000102 | BUSINESS SYSTEM 102 | 2015/10/30 12:23:45 | LOW |
| S000104 | R000104 | BUSINESS SYSTEM 104 | 2015/10/30 14:23:23 | LOW |
| S000105 | R000105 | BUSINESS SYSTEM 105 | 2015/10/30 15:23:48 | HIGH |
| S000106 | R000106 | BUSINESS SYSTEM 106 | 2015/10/30 16:00:40 | HIGH |

← ADDED (last row)

SETTING SUPPORT PROGRAM, SETTING SUPPORT METHOD, AND SETTING SUPPORT DEVICE

CROSS-REFERENCE TO RELATED APPLICATION

This application is based upon and claims the benefit of priority of the prior Japanese Patent Application No. 2016-092970, filed on May 6, 2016, the entire contents of which are incorporated herein by reference.

FIELD

The present invention relates to a setting support program, a setting support method, and a setting support device.

BACKGROUND

In general, the operation of a business system by a computer includes operation monitoring that monitors the states of computer equipment that constitutes the business system and software executed in the computer for the purpose of stable operation of the business system.

Normally, in the operation monitoring, a monitoring target and a monitoring method are designed, and a monitoring server performs the operation monitoring based on the designed monitoring target and monitoring method to perform determination of whether or not the business system operates appropriately and detection of occurrence of an abnormality. When the business system is released after application development and unit testing of the business system are ended, an operations manager performs an operation monitoring test in addition to an operation test of the business system in a testing environment before the production of the business system is started to evaluate the validity of definition of the operation monitoring. When the results of the operation test and the operation monitoring test are favorable, the definition of the operation monitoring is applied to a production environment.

On the other hand, in cloud computing, a cloud provider deploys a server center that has a plurality of physical machines, a storage, and a network, while a client that receives a cloud computing service (hereinafter simply referred to as a cloud service) generates a virtual machine in the physical machine in the server center to construct a desired service system. In such a cloud service, the operation monitoring of the business system of the client has recently been performed mainly by the cloud provider as its service.

Consequently, at a stage of release of the business system, the cloud provider needs to perform the operation monitoring test to determine the monitoring definition suitable for the business system.

In the operation monitoring, for the operation monitoring of an infrastructure layer such as hardware like a physical computer, an operating system, or basic middleware, a specific monitoring definition (monitoring definition pattern) is standardized. Consequently, in the operation monitoring of the infrastructure layer, it is only needed to prepare a plurality of the monitoring definition patterns and appropriately select the monitoring definition pattern in accordance with the request of the client, and hence it is possible to automate the design of the monitoring definition and the operation monitoring based on the designed monitoring definition.

The operation monitoring is disclosed in each of Japanese Patent Application Laid-open No. 2010-113381, Japanese Patent Application Laid-open No. 2013-164734, and Japanese Patent Application Laid-open No. 2008-299387.

SUMMARY

One aspect of the present embodiment is a non-transitory computer-readable storage medium that stores therein a setting support program related to monitoring of a system, the setting support program causing a computer to execute a process including receiving an input of first system information including a first configuration element group of a first system; identifying setting information related to monitoring of second system corresponding to a second configuration element group of the second system having predetermined similarity to the first configuration element group included in the first system information by referring to a storage that stores the second configuration element group of the second system and the setting information related to the monitoring of the second system for a plurality of the second systems; and outputting the identified setting information as setting information of the first system.

According to the first aspect, it is possible to reduce the steps at the time of the system release.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a flowchart illustrating the process of the simulation system deployment program.

FIG. 7 is a flowchart illustrating detailed processes in Steps S14_2, S32, and S36 in the simulation system deployment program.

FIG. 8 is a diagram illustrating each index (element) of the application close-monitoring necessity index pattern and the outline thereof.

FIG. 9 is a diagram illustrating examples of a method for acquiring the index (element).

FIG. 10 is a view illustrating an example of the list of the application close-monitoring necessity index pattern of the existing business system.

FIG. 11 is a view illustrating three examples of the index pattern of the new business system.

FIG. 12 is a view illustrating an example of a simulation system deployment management table managed by the simulation system deployment program.

DESCRIPTION OF EMBODIMENTS

For the operation monitoring of an application layer, the structure of an application differs from one client or business to another, and a monitoring policy that determines whether or not close-monitoring of the application is performed also varies. Consequently, in the existing conditions, it is difficult to standardize or automate the monitoring definition of the application. As a result, the operations manager determines whether only an error message outputted by the application is monitored (hereinafter referred to as application simple-monitoring), or operation time of the application or the use state of a hardware resource is closely monitored (hereinafter referred to as application close-monitoring) with manpower, and determines the monitoring definition according to the operation monitoring test.

In the case where the cloud provider performs the operation monitoring test to perform verification of the monitoring definition in the cloud service, the cloud provider needs to deploy the testing environment of the business system serving as the monitoring target, performs the operation monitoring test in the testing environment, and performs the verification of the monitoring definition. In general, each of the deployment of the testing environment and the verification of the monitoring definition needs a large number of steps, and the client that desires the production of the business system in a short cycle requests completion of the operation monitoring test in a short time period.

Figure 1:
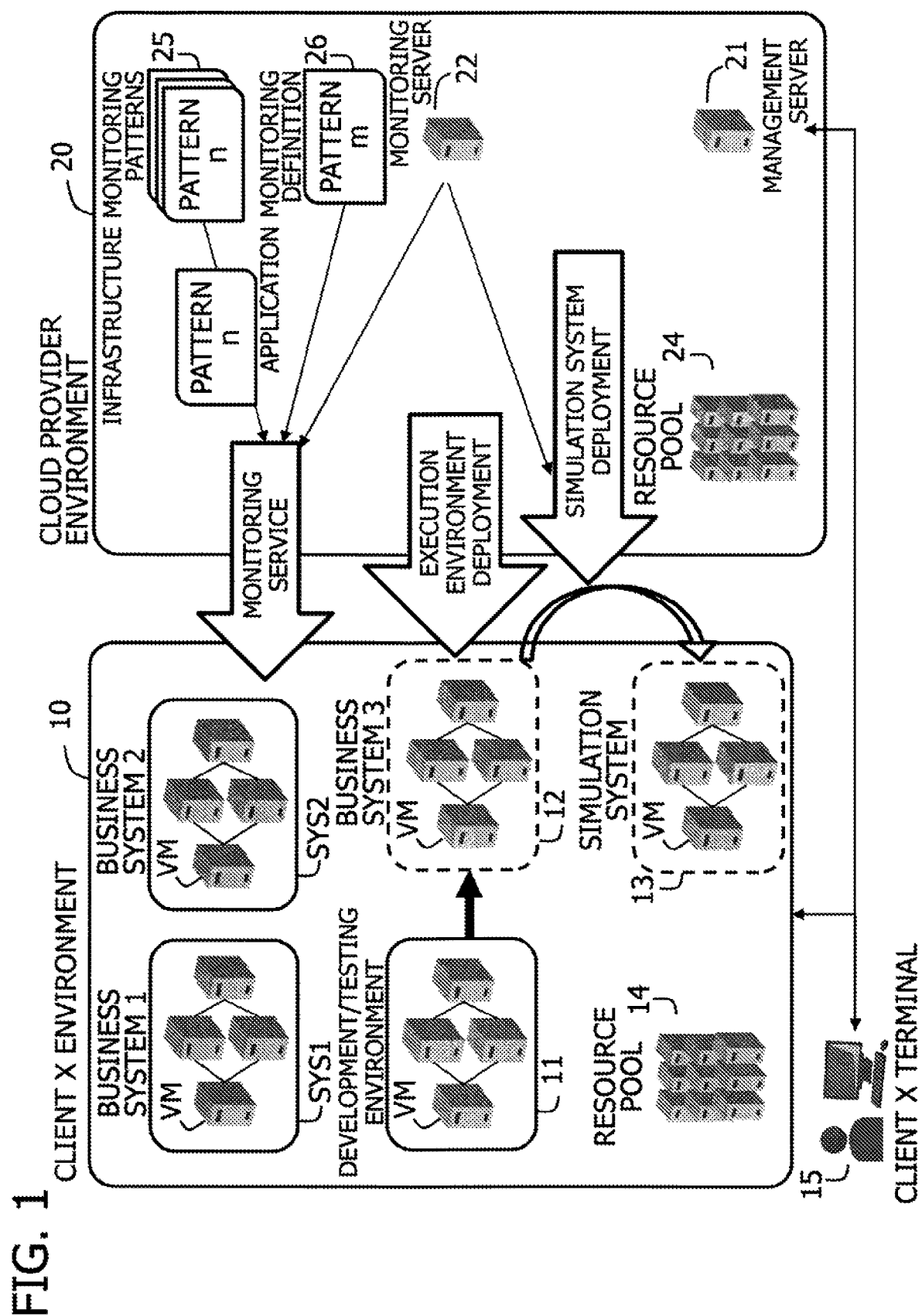
FIG. 1 is views illustrating an operation monitoring test in a client environment and a cloud provider environment in a cloud service.
Figure 2:
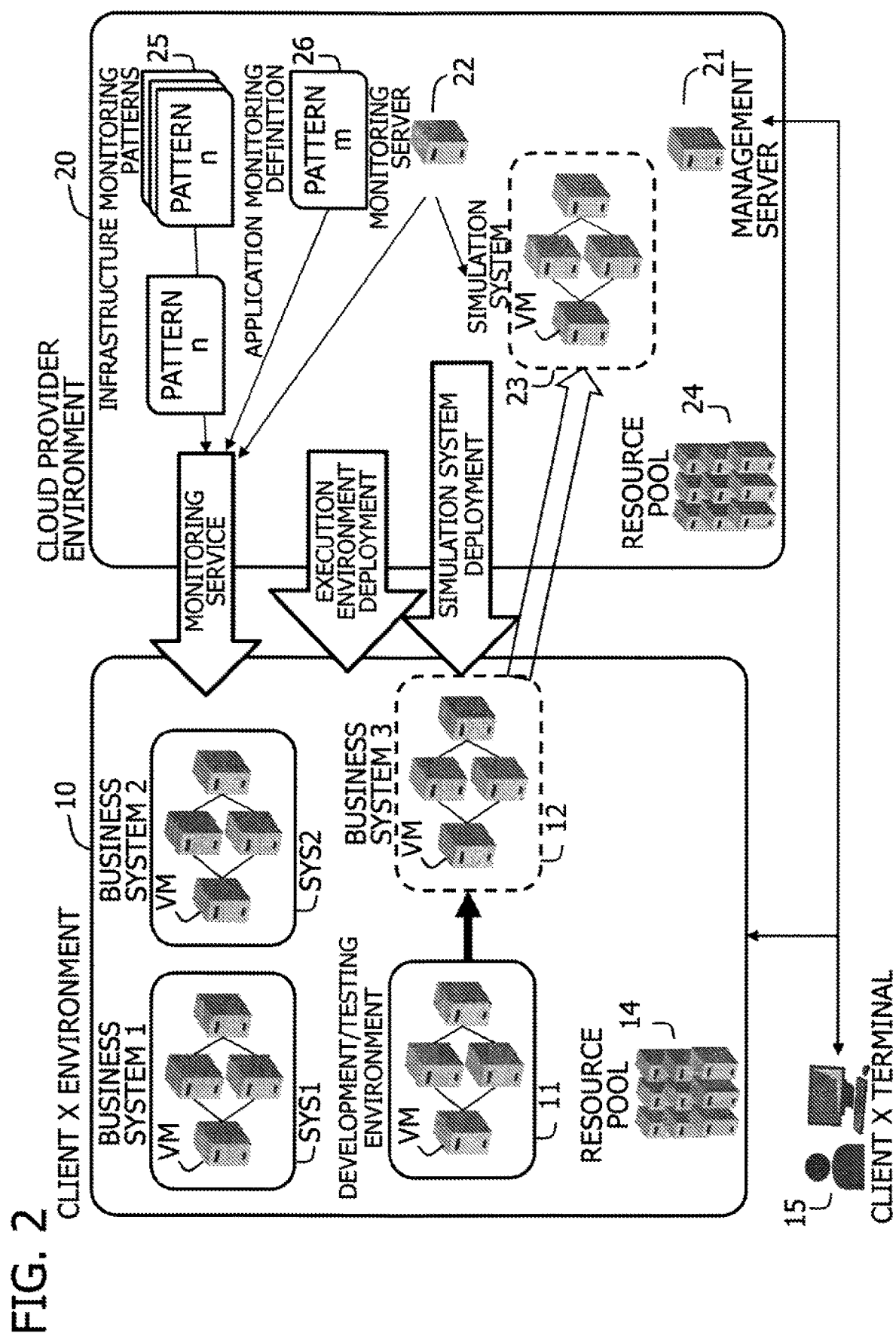
FIG. 2 is views illustrating an operation monitoring test in a client environment and a cloud provider environment in a cloud service.

FIGS. 1 and 2 are views illustrating an operation monitoring test in a client environment and a cloud provider environment in a cloud service. In FIGS. 1 and 2, a cloud provider environment 20 that provides the cloud service and a client X environment 10 that receives the cloud service are deployed in a server center. A resource pool 14 that includes hardware such as a physical machine, a storage, and a network is deployed in the client X environment 10 and, for example, a business system 1 (SYS1) and a business system 2 (SYS2) are generated with a plurality of virtual machines VM, and the business systems provide desired services.

On the other hand, also in the cloud provider environment 20, a resource pool 24 that includes hardware such as the physical machine, the storage, and the network is deployed, and a management server 21 that manages the generation of the business system in the client X environment 10 and a monitoring server 22 that monitors the operation of the business system are generated by, for example, the physical machine and the virtual machine generated in the physical machine.

A client X terminal 15 is deployed outside or inside the client X environment 10, accesses a cloud service site provided by the management server 21, and requests the management server 21 to deploy the virtual machine constituting the business system in the client X environment or delete the virtual machine. In response to the request, the management server 21 executes the deployment or the deletion of the virtual machine of the business system requested by the client X. Specifically, the management server 21 transmits a command that requests the generation and deletion of the virtual machine to virtualization software (hypervisor) of the physical machine of the resource pool 14 in the client X environment to execute the deployment and deletion of the virtual machine.

The monitoring server 22 performs monitoring of the business systems 1 (SYS1) and 2 (STS2) at an infrastructure level with a pattern selected from a plurality of infrastructure monitoring patterns 25. In addition, the monitoring server 22 performs application simple-monitoring or application close-monitoring of the business system that is determined to need monitoring at an application level based on a customized application monitoring definition 26.

In the client X environment 10, in the case where a new business system 3 of the client X is deployed, the client X requests the management server 21 to deploy an application development/testing environment 11 of the business system 3 from the terminal 15, and performs the development and unit testing of an application with a system that includes the virtual machines of the deployed application development/testing environment 11. When the application development and the testing are ended, the client X requests the management server 21 to deploy an execution environment (or a production environment) 12 of the business system 3 from the terminal 15, and performs a final test in the deployed execution environment 12. The stage of deployment of the execution environment 12 of the business system is referred to as release of the application in the present specification.

Before the actual operation of the business system 3 after the stage of the release, the client X sometimes requests the application close-monitoring of the new business system 3 to the cloud provider. In the cases, the cloud provider is requested to design and evaluate the application monitoring definition of the business system 3 of the execution environment 12 in a short time period. Accordingly, the cloud provider copies virtual machines VM of the execution environment 12 of the business system 3 and deploys a testing environment 13 of the business system 3 via the management server 21, and the monitoring server 22 simulates monitoring based on the predesigned application monitoring definition in a simulation system of the testing environment 13. Subsequently, the cloud provider evaluates the validity of the application monitoring definition based on the monitoring result. The management server 21 can acquire the configuration of the business system 3 to which the developed application belongs with a configuration information acquisition command, and the managing server can deploy the simulation system 13 based on the acquired configuration information. Alternatively, in the case where the management server 21 can acquire an image file of the production environment 12 of the business system 3, the managing server can activate the virtual machines of the copy of the image file to deploy the simulation system 13.

There are cases where the simulation system 13 is deployed by using the resource pool 14 in the client X environment 10 as illustrated in FIG. 1, and there are cases where the simulation system 13 is deployed by using the resource pool 24 in the cloud provider environment 20 as illustrated in FIG. 2.

Subsequently, when the final test in the execution environment 12 of the business system 3 after the release is completed and the evaluation result of the application monitoring definition in the simulation system 13 is successful, the business system 3 is put into production in the execution environment 12. In the production, the monitoring server 22 performs the monitoring at the infrastructure level with a predetermined combination pattern of the infrastructure monitoring patterns 25, and also performs the application monitoring based on the customized application monitoring definition 26.

In general, the client determines an operation monitoring policy of the business system immediately before the production. Consequently, in many cases, the client has not determined whether or not the application close-monitoring is performed on the business system at the stage of the release of the application. On the other hand, a time period from the end of the final test in the production environment 12 of the business system to the production needs to be reduced as much as possible.

Consequently, when the cloud provider that performs the operation monitoring always copies the virtual machine of the production environment 12 of the business system to deploy the simulation system 13 at the stage of the release of the application, it is possible to design, test, and evaluate the application monitoring definition with the simulation system 13 upon receipt of a monitoring request to the application layer from the client, and complete the creation of the application monitoring definition having high quality in a short time period.

However, in a cloud service environment such as infrastructure as a service (IaaS) or platform as a service (PaaS), the release of the application is performed frequently in various business systems of various clients, and hence the deployment and retention of many simulation systems are needed. As a result, abundant hardware resources for the monitoring service are needed and the cost of the service is increased.

The case where the monitoring of the application layer is performed is the case where the importance of the business system is high in general. Accordingly, by determining the importance of the business system with a single index such as a resource consumption of the business system and deploying the simulation system only to the business system of which the importance is determined to be high at the stage of the release of the application, it is possible to significantly save a resource use amount for the monitoring service.

However, in the cloud service environment, various business systems of various clients operate, the evaluation index of the importance of the business system varies, and the accuracy in the necessity determination of the application close-monitoring of the business system with the single index such as the resource consumption is low. As a result, the case where the simulation system is deployed to the business system that does not need the application close-monitoring but has the large resource consumption so that the resource is wasted or, conversely, the simulation system is not deployed to the business system that needs the application close-monitoring but has the small resource consumption so that the determination of the application monitoring definition takes time occurs frequently.

First Embodiment

Figure 3:
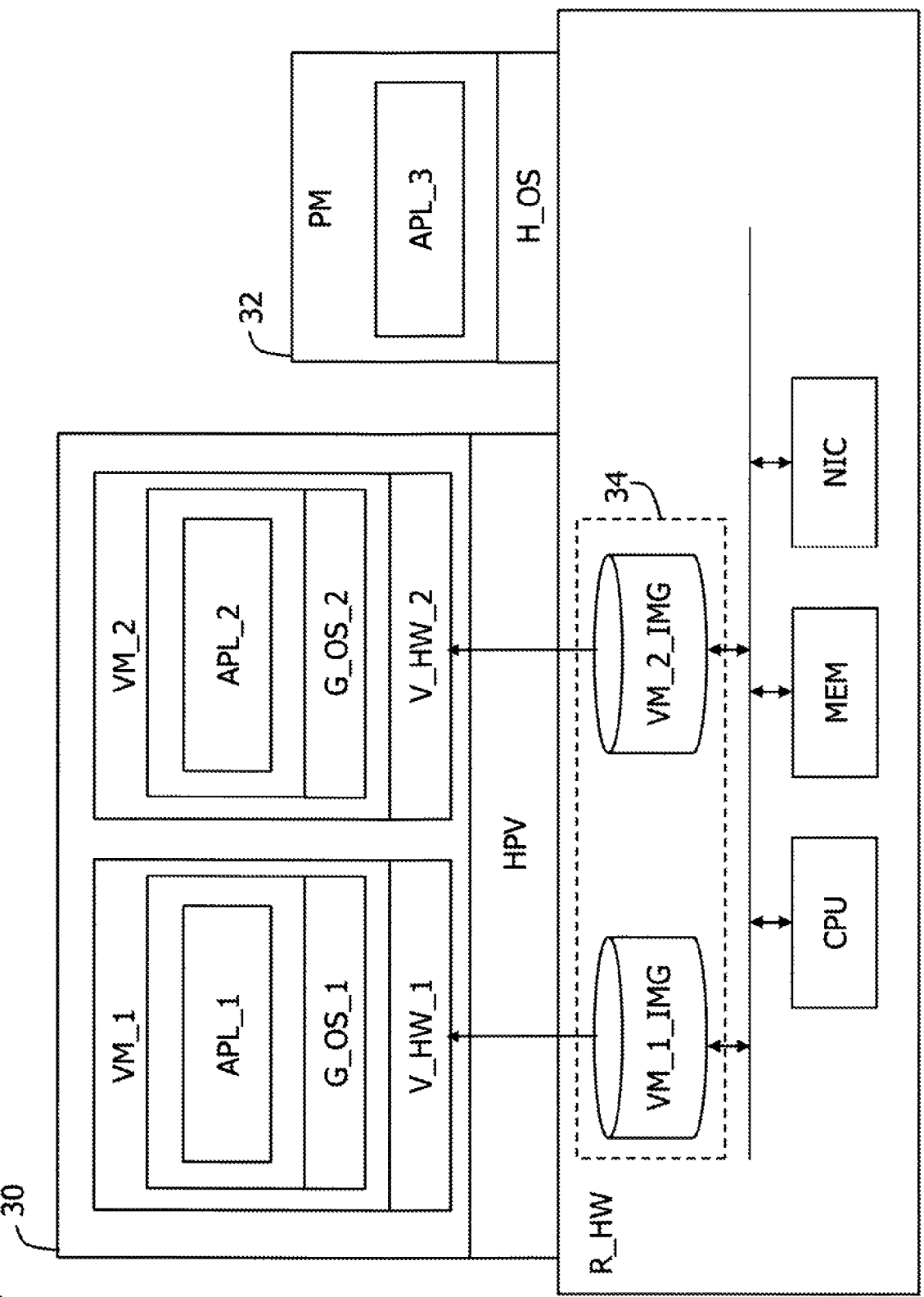
FIG. 3 is a view illustrating an example of the hardware resource of the cloud service environment in the present embodiment.

FIG. 3 is a view illustrating an example of the hardware resource of the cloud service environment in the present embodiment. FIG. 3 illustrates a virtual machine environment and a physical machine environment configured on the physical machine as the hardware resource. Real hardware R_HW constituting the physical machine includes a central processing unit or a processor (CPU), a main memory MEM, a network interface NIC, and a large-capacity auxiliary storage device 34 such as an HDD or an SSD.

In the auxiliary storage device 34, a host OS and a hypervisor HPV as virtualization software, for example, are stored, and they are loaded into the main memory MEM and executed by the CPU. In a physical machine environment 32, a host OS (H_OS) and an application APL_3 are executed by the CPU. On the other hand, in a virtual machine environment 30, the hypervisor HPV is executed by the CPU, the real hardware R_HW is virtualized based on virtual machine configuration information that is not illustrated, and virtual hardware V_HW_1 and virtual hardware V_HW_2 are assigned to virtual machines VM_1 and VM_2. Subsequently, a guest OS (G_OS_1) and an application APL_1 are executed on the virtual hardware V_HW_1 in the virtual machine VM_1, and a guest OS (G_OS_2) and an application APL_2 are executed on the virtual hardware V_HW_2 in the virtual machine VM_2.

When the guest OS (G_OS_1) and the application APL_1 are initialized in the case where the hypervisor HPV activates the virtual machine VM_1 for the first time, an image file VM_1_IMG of the virtual machine VM_1 is generated in the auxiliary storage device 34. In the case where the virtual machine VM_2 is activated for the first time as well, an image file VM_2_IMG of the virtual machine VM_2 is generated in the auxiliary storage device 34.

The virtual machines VM that constitute the business systems SYS1, SYS2, and 12, the application development/testing environment 11, and the simulation system 13 in the client X environment 10 illustrated in FIGS. 1 and 2 correspond to the virtual machines VM_1 and VM_2 illustrated in FIG. 3. Similarly, the management server 21 and the monitoring server 22 in the cloud provider environment 20 are constituted by the virtual machines VM_1 and VM_2 in FIG. 3.

Consequently, the application program of the business system and the application that is being developed or the application of the simulation system correspond to the applications APL_1 and APL_2 in the virtual machines VM_1 and VM_2. In addition, the management application of the management server 21 and the monitoring application of the monitoring server 22 also correspond to the applications APL_1 and APL_2 in the virtual machines VM_1 and VM_2.

Figure 4:
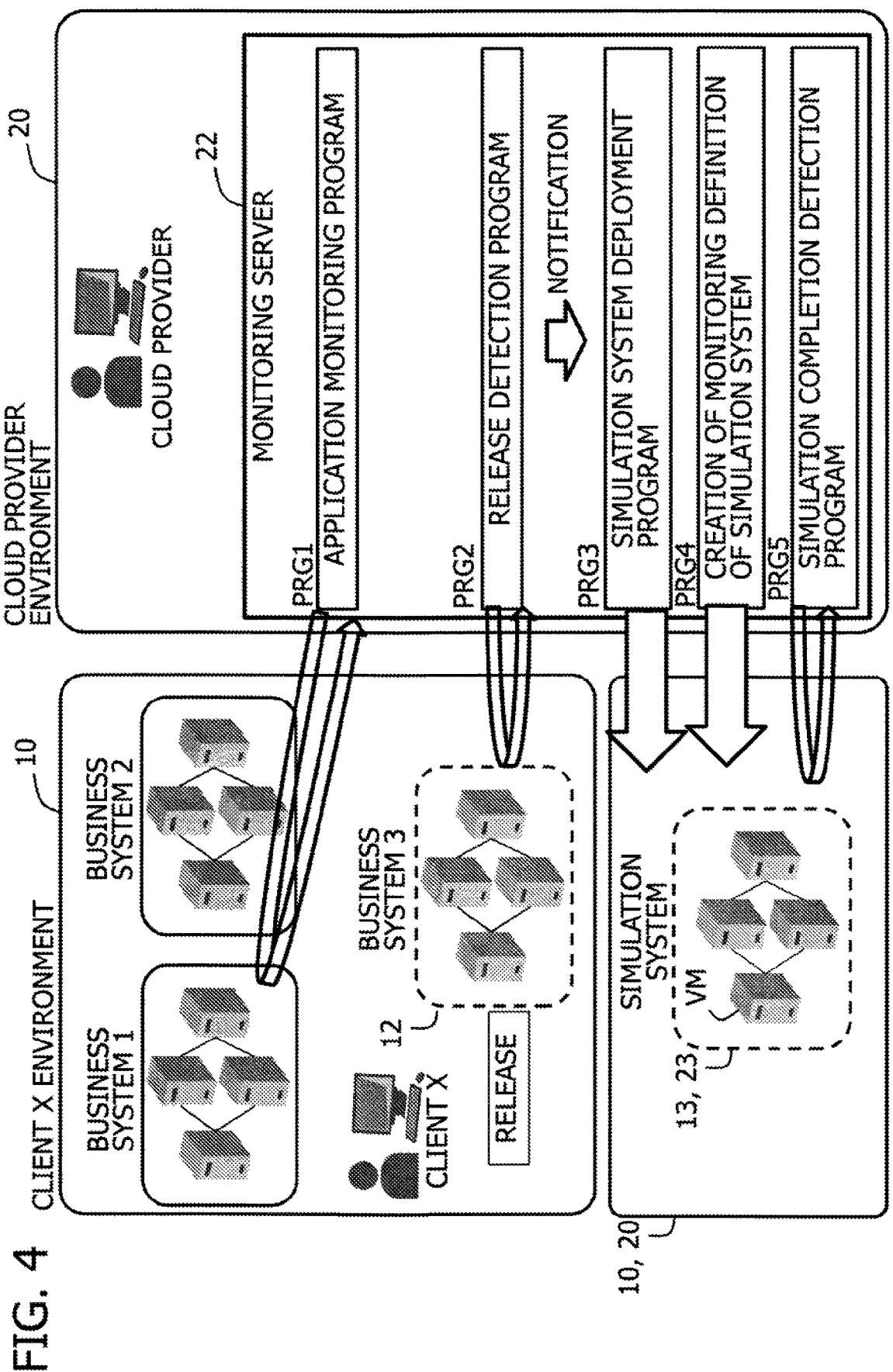
FIG. 4 is a view illustrating a program group executed by the monitoring server in the present embodiment.

FIG. 4 is a view illustrating a program group executed by the monitoring server in the present embodiment. In FIG. 4, the simulation system 13 or 23 is constituted by the resource pool of the hardware in the client X environment 10 or the cloud provider environment 20.

The monitoring server 22 deployed in the cloud provider environment 20 executes an application monitoring program PRG1 that performs application monitoring on one of the existing business systems that is determined to need the application close-monitoring based on a predetermined application monitoring definition. Further, the monitoring server 22 executes a release detection program PRG2 to detect the release of the application of the new business system 3 that is being developed or improved by the client X.

In response to the notification of the release, the monitoring server 22 executes a simulation system deployment program PRG3 to determine whether or not the application close-monitoring of the released new business system 3 is requested. The determination method will be described later in detail and, the outline of the determination method is as follows. Based on of the existing system, and the correspondence between a configuration element group, which includes presence or absence of a specific configuration element and a performance factor of the configuration element such as the CPU or the memory, and the application close-monitoring necessity of the existing business system, the application close-monitoring necessity of the existing business system having the configuration element group similar to that of the new business system is identified and the identified application close-monitoring necessity is used as the application close-monitoring necessity of the new business system.

Subsequently, in the case where it is determined that the application close-monitoring is needed, the simulation system deployment program PRG3 copies the new business system 3 of the released application to deploy the simulation system 13 or 23 by using the hardware of the resource pool. The deployment of the simulation system can be performed by copying and activating the image file in the case where it is possible to acquire the image file of the business system 3. Alternatively, in the case where it is possible to acquire configuration information of the virtual machine of the business system 3 (information on the number of clocks of the CPU, a memory capacity, an HDD capacity, a communication band, the guest OS, and the application), it is possible to activate and generate the simulation system based on the configuration information.

The cloud provider executes the application monitoring with the application monitoring program PRG1 based on the designed application monitoring definition while executing the developed application in the simulation system. Examples of the application monitoring definition include an operation time period of the monitoring, the upper limit value and the lower limit value of the number of processes assigned to web access, the upper limit value and the lower limit value of a CPU utilization rate, and the upper limit value and the lower limit value of a virtual memory capacity. Based on these monitoring definitions, for example, when the number of processes, the CPU utilization rate, or the virtual memory capacity exceeds the upper limit value or the lower limit value and has a value outside an assumed range, the application close-monitoring such as outputting a warning is performed. An application monitoring definition creation tool PRG4 is, e.g., one of tools that belong to the application monitoring program PRG1.

In the case where the verification result of the application monitoring definition is favorable, the creation of the application monitoring definition in the application monitoring program is ended, and hence the monitoring server 22 executes a simulation completion detection program PRG5 to detect the establishment of the application monitoring definition.

Next, the entire step of the deployment of the new business system in the cloud service according to the present embodiment will be described, and a process of the simulation system deployment program and the application monitoring definition will be described.

[New Business System Deployment Step]

Figure 5:
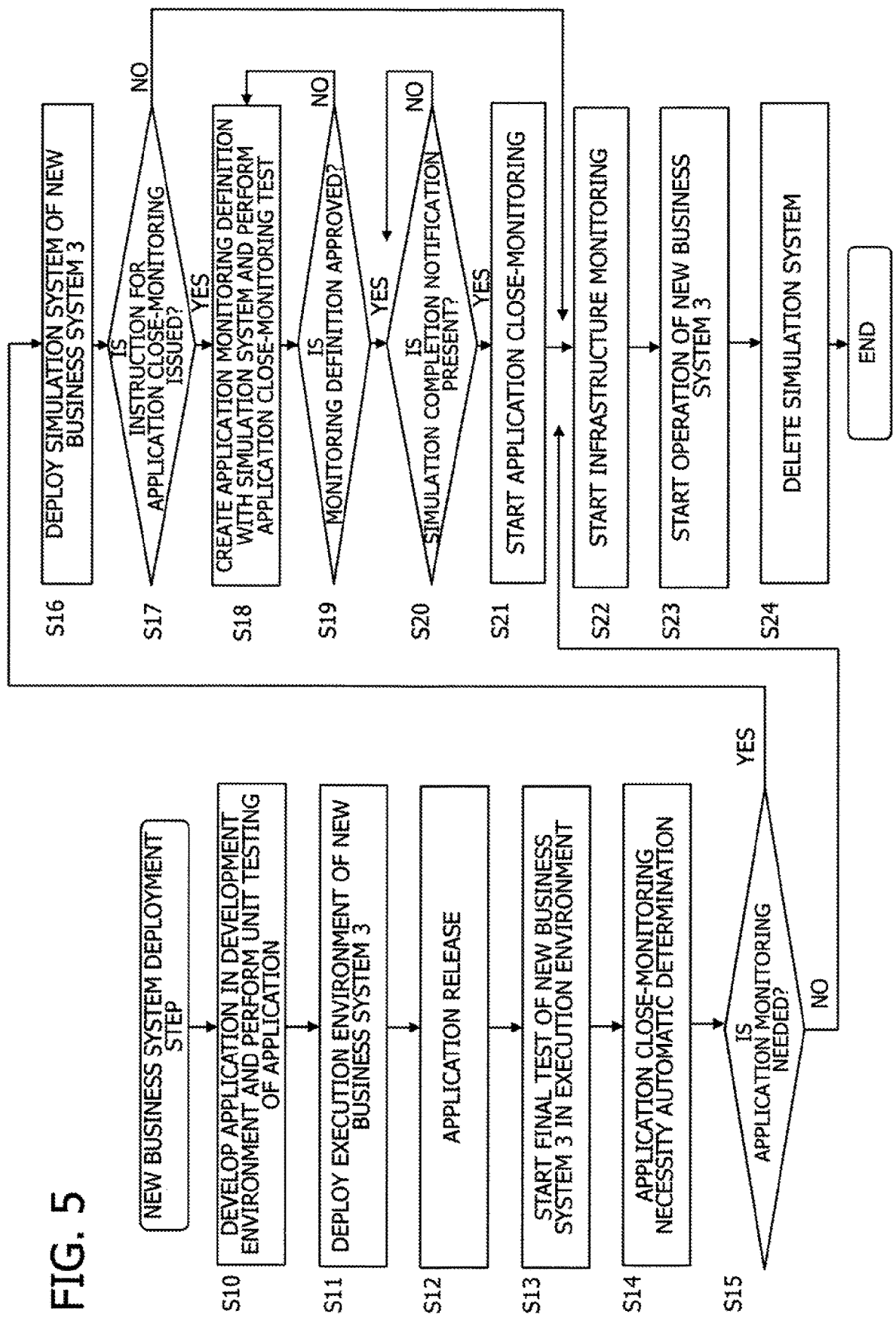
FIG. 5 is a flowchart illustrating the entire step of the deployment of the new business system in the cloud service.

FIG. 5 is a flowchart illustrating the entire step of the deployment of the new business system in the cloud service. As illustrated in FIGS. 1 and 2, the client of the cloud system develops the application in the development environment 11 in the client environment 10, and performs the unit operation test of the application (S10). When the development and the unit operation test of the application are completed, the client deploys the production environment 12 of the new business system 3 in the client environment 10 (S11). In the new business system 3, the developed new application is executed by the virtual machine. With this, the application is released (S12), and the final test of the new business system in the production environment 12 is started (S13).

In the present embodiment, the monitoring server 22 executes the release detection program PRG2 to detect the release of the application described above. The monitoring server 22 executes the simulation system deployment program PRG3 in response to the notification of the application release to automatically determine whether or not the application close-monitoring of the new application of the new business system is needed (S14). When it is determined that the application close-monitoring is needed by the automatic determination of the application close-monitoring necessity (YES in S15), the monitoring server 22 executes the simulation system deployment program PRG3 to deploy the simulation system 13 or 23 of the new business system 3 (S16).

As described above, the monitoring server performs the automatic determination step S14 of the application close-monitoring necessity described above to predict whether or not the application close-monitoring is need with high accuracy, and deploys the simulation system for the new business system that is determined to need the application close-monitoring by using the resource pool in the client environment 10 or the cloud provider environment 20. Steps S14, S15, and S16 mentioned above will be described in detail in the process of the simulation system deployment program PRG3 described later.

When the instruction for the application close-monitoring is issued from the client of the new business system during or at the end of the final test of the new business system after the application release (YES in S17), the cloud provider creates the application monitoring definition with the deployed simulation system, and executes the application monitoring program of the monitoring server 22 to perform the application close-monitoring test based on the created application monitoring definition (S18). Specifically, the simulation system executes the new application, and the monitoring server performs the application close-monitoring based on the application monitoring definition. Subsequently, the monitoring server evaluates the monitoring result together with the client of the new business system, and determines the validity of the created monitoring definition (S19). In the case where the monitoring result indicates that the created monitoring definition is not valid, another creation of the application monitoring definition and the application close-monitoring test S18, and the determination of the validity of the monitoring definition S19 are repeated.

When the monitoring definition is approved (YES in S19), an application monitoring definition setting operation by the cloud provider is performed on a setting screen of the application monitoring program PRG1 of the monitoring server, and the simulation completion detection program PRG5 detects the completion of the simulation (S20). As a result, the approved application monitoring definition is set as the application monitoring definition of the new business system in the monitoring server 22, and the application close-monitoring by the monitoring server 22 is started (S21).

The creation and the approval steps S18 and S19 of the application monitoring definition described above will be described in detail later.

After the application release (S12) or when the application monitoring is started, an infrastructure monitoring definition selected automatically or with manpower is set in the monitoring server 22, and the monitoring server 22 starts the infrastructure monitoring based on the infrastructure monitoring definition (S22). In addition, at the same time as the start of the monitoring by the monitoring server (S21, S22), the production of the new business system 3 is started and the business is started (S23). Subsequently, the simulation system deployment program deletes the simulation system (S24).

[Process of Simulation System Deployment Program PRG3]

FIG. 6 is a flowchart illustrating the process of the simulation system deployment program. The simulation system deployment program PRG3 executes processes in Steps S14, S15, and S16 in FIG. 6.

The monitoring server 22 executes the simulation system deployment program PRG3 to execute the following processes. First, the monitoring server 22 automatically extracts an application close-monitoring necessity index pattern of the existing business system in advance (S30). The application close-monitoring necessity index pattern is a combination of a predetermined element group (the element and the performance factor of the element) of the business system.

The extraction of the application close-monitoring necessity index pattern is performed by (1) determining whether or not each existing business system corresponds to each index (configuration element) of the application close-monitoring necessity index pattern, (2) extracting information on whether or not the existing business system performs the application close-monitoring from an operation management internal database, and (3) generating an application close-monitoring necessity index pattern that associates the index pattern (the configuration element group) which the existing business system has with the application close-monitoring necessity (or unnecessity), and storing the application close-monitoring necessity index pattern in the memory MEM of the physical machine that constitutes the monitoring server 22.

FIG. 8 is a diagram illustrating each index (configuration element) of the application close-monitoring necessity index pattern and the outline thereof. FIG. 8 illustrates 11 examples of indexes (configuration elements) a to k. Note that these indexes (configuration elements) are only examples and are not limited thereto, and the combination thereof may differ from one client to another.

The indexes (configuration elements) a to e are configuration factors of the indexes, and each index indicates the presence or absence of a predetermined configuration element. The element a has a configuration that has a load balancer at a front position of a web server of the business system. That is, in general, the business system that uses the cloud service includes a plurality of the web servers that receive access requests via the network such as the Internet or an intranet in order to access the business system. The web server passes the request received from the outside to a virtual server that constitutes a business service system. In order to improve the response performance of the web server, a server level balancer (SLB) provided at a stage previous to the web server adequately distributes the received requests to the plurality of web servers. Consequently, the element a is the load balancer provided at the front of the web server.

The element b has a configuration that has a firewall at the front of the web server. As described above, the web server passes the request received from the outside to the virtual server that constitutes the business service system. Subsequently, in order to protect the virtual server of the business service system from the access from the outside, a firewall server is disposed. Consequently, the element b is the firewall provided at the front of the web server.

The element c has a configuration in which both of read and write from and to a database server provided in the business service system are performed. In the case where the business system is a backbone system, read and write are frequently performed in the database server. On the other hand, in the case where the business system is not the backbone system, for example, only reference to data for information collection is performed as a monthly process, only read is performed in the database server, and the frequency of execution of write is low.

The element d has a configuration for a disaster countermeasure option. For example, in the case where the business system has a function of continuing the business service in another environment when a disaster occurs, the business system has the configuration for the disaster countermeasure option. Consequently, the element d has the function of allowing the continuation of the business service when the disaster occurs.

The element e is characterized in that the business system is duplicated with a cluster configuration. In the case where the virtual server group that constitutes the business system is duplicated with the cluster configuration, even when the business system of one cluster is stopped, the business system of the other cluster can continue the business. Consequently, the element e has the duplicated business system and the function of allowing the continuation of the business when any error occurs.

Next, indexes (configuration elements) f to k are performance factors of the indexes, and each index indicates performance of the element in a normal state. The element f has a configuration in which the CPU utilization rate (e.g., the number of used clocks per unit time) is higher than the lowest value of the business system of the client of which the application close-monitoring is performed.

The element g is the total memory amount, and has a configuration in which the memory amount (capacity) assigned to the business system is higher than the lowest value of the business system of the client of which the application close-monitoring is performed.

The element h is a band size of a communication line, and has a configuration in which the band size of the communication line is higher than the lowest value of the business system of the client of which the application close-monitoring is performed.

The element i is the utilization amount or utilization rate of the storage, and has a configuration in which each of the utilization amount (capacity) and the utilization rate (the rate of total access time per unit time) is higher than the lowest value of the business system of the client of which the application close-monitoring is performed.

The element j is the number of network interfaces and has a configuration in which the number of network interfaces set in the business system, e.g., the number of virtual network interface cards (NIC) is more than the lowest value of the business system of the client of which the application close-monitoring is performed.

Lastly, the element k is the number of processes that receive the requests of the web server, and is the index in a configuration in which the number of processes that have received the requests during the operation changes to a value outside an assumed range.

FIG. 9 is a diagram illustrating examples of a method for acquiring the index (configuration element). The monitoring server 22 executes the simulation system deployment program PRG3 to acquire each index (configuration element) of the application close-monitoring necessity index pattern illustrated in FIG. 8 by any method, and determines whether or not the existing business system corresponds to the index (configuration element). FIG. 9 illustrates examples of the acquisition method.

With regard to the load balancer of the element a and the firewall of the element b, it is possible to acquire configuration information (MIB) of the business system with an inventory information collection command (e.g., a snmpwalk command) in the operating business system of the client. It is possible to acquire information on the execution of read and write from and to the database server of the element c and the frequency of the execution thereof from logs of read and write.

In addition, with regard to the disaster countermeasure option of the element d and the duplication of the business system of the element e, it is possible to acquire an environment setting property of the client that can be acquired with an application program interface (API) of the cloud service, and acquire option information from the environment setting property.

Next, it is possible to acquire the elements f (the CPU utilization rate), g (the total memory amount), and h (the communication line band) as the performance factors from the guest OS of the virtual machine of the business system. In addition, it is possible to acquire the element i (the utilization rate and the utilization amount of the storage) from the storage. Further, it is possible to acquire the element j (the number of network interfaces) with the inventory information collection command (the snmpwalk command). Furthermore, with regard to the element k (large change of the number of processes for receiving the request of the web server), it is possible to acquire the change of the number of processes with a process number collection command.

The monitoring server 22 executes the simulation system deployment program to determine whether or not each of the existing business systems correspond to the index (configuration element) of the application close-monitoring necessity index pattern as described above, and further extracts the information on whether or not each of the business systems performs the application close-monitoring from the operation management internal database. Subsequently, the monitoring server 22 generates the application close-monitoring necessity index pattern in which the index pattern (configuration element group) to which the existing business system corresponds is associated with the application close-monitoring necessity, and stores the application close-monitoring necessity index pattern in the memory of the physical machine of the monitoring server.

FIG. 10 is a view illustrating an example of the list of the application close-monitoring necessity index pattern of the existing business system. In the list 50 in FIG. 10, the index (configuration element) patterns of six existing business systems (elements having circles in the drawing) are associated with the application close-monitoring necessity of the individual business systems. Consequently, the list (set) 50 of the application close-monitoring necessity index pattern and the monitoring necessity of the existing business system of a given client has features of the elements related to an application close-monitoring necessity determination criterion peculiar to the given client.

The client of the list of the application close-monitoring necessity index pattern in FIG. 10 sets each of business systems 2, 3, and 4 corresponding to the elements a, e, and k (the load balancer of the web server, the duplication of the business system, and the large change of the number of processes for receiving the request of the web server) to "APPLICATION CLOSE-MONITORING IS NEEDED".

Each of the business systems 2, 3, and 4 of the client corresponds to the element a, and hence each of the business systems has a configuration feature that the load distribution of the web server is performed and importance is thereby placed on response, solidness at the time of occurrence of a trouble is improved by the duplication of the business system by using the cluster, but the change of the number of processes is large. In addition, each of the business systems 2, 3, and 4 does not correspond to the elements f, g, h, and i, and hence the business system has a feature that the consumption of the hardware resource is small.

Consequently, it can be considered that, in the business systems 2, 3, and 4, the client puts importance on the response and the solidness in spite of the small consumption of the hardware resource, and the client desires the application close-monitoring because the change of the number of processes for receiving the access is large.

On the other hand, with regard to business systems 1 and 5 that correspond to the elements b and c (the firewall, both of read and write from and to the database server), the business system 1 is set to "APPLICATION CLOSE-MONITORING IS NEEDED", but the business system 5 is set to "APPLICATION CLOSE-MONITORING IS NOT NEEDED". In addition, a business system 6 that corresponds only to the elements g and h (the total memory amount, the communication line band size) is set to "APPLICATION CLOSE-MONITORING IS NOT NEEDED".

Returning to FIG. 6, when the monitoring server 22 executes the simulation system deployment program PRG3 and receives the release notification of the application of the new business system (S31 (S12)), the monitoring server 22 performs the automatic determination of the application monitoring necessity (S14_1, S14_2). The automatic determination of the application monitoring necessity includes the step of extracting the index (element) pattern of the released new business system (S14_1), and the step of comparing the index pattern of the new business system with the application close-monitoring necessity index pattern of the existing business system peculiar to the client, and extracting the information on the monitoring necessity of the existing business system having the index pattern that matches the index pattern of the new business system (S14_2). In Step S14_1, it is determined whether or not the new business system corresponds to the index (element) by the same method as that explained in Step S30. On the other hand, Step S14_2 will be described later in detail.

In the case where the existing business system having the index pattern that matches that of the new business system is set to "MONITORING IS NEEDED", the monitoring server predicts that a probability that the new business system is set to "APPLICATION CLOSE-MONITORING IS NEEDED" (YES in S15), and deploys the simulation system of the new business system (S32 (S16)). This prediction is performed based on matching with the index pattern that needs the application close-monitoring peculiar to the client, and hence the prediction accuracy is high.

In addition, in the step of deploying the simulation system of the new business system, the monitoring server 22 requests the management server 21 to deploy the virtual machine group of the clone of the new business system. For example, the management server 21 can acquire a configuration information file of the new business system and deploy the virtual machine VM group of the clone of the new business system based on the configuration information file. Alternatively, the management server 21 copies the image file of the new business system and activates the virtual machine group of the copy of the image file to thereby deploy the virtual machine group of the clone of the new business system.

When the simulation system is deployed, the cloud provider creates the application monitoring definition of the simulation system, and the monitoring server 22 executes the application close-monitoring with the created definition and verifies the monitoring result together with the client. Subsequently, in the case where the verification result of the application monitoring definition is favorable, the application monitoring definition creation step is ended, and the monitoring server 22 receives a simulation completion notification from the simulation completion detection program PRG5 (YES in S33)

In response to this, the monitoring server 22 sets the created application monitoring definition in the application monitoring program of the new business system by executing the application monitoring definition creation program (S34). With this setting, the monitoring server 22 can execute the application close-monitoring based on the set application monitoring definition by executing the application monitoring program in the production of the new business system.

When the production of the new business system is started (YES in S35), the monitoring server 22 deletes the simulation system (S36 (S24)).

FIG. 7 is a flowchart illustrating detailed processes in Steps S14_2, S32, and S36 in the simulation system deployment program PRG3. First, Step S14_2 in FIG. 6 is constituted by Steps S14_2 to S14_5 in FIG. 7. That is, in FIG. 7, the monitoring server 22 compares the index pattern of the new business system with the application close-monitoring necessity index pattern of the existing business system peculiar to the client to determine whether or not they match each other (S14_2) and, in the case where the index pattern that matches with the new business system is present in the application close-monitoring necessity index pattern (YES in S14_3), the monitoring server 22 determines whether the index pattern of the new business system matches only the pattern that needs the application close-monitoring (S14_4) or only the pattern that does not need the application close-monitoring (S14_5).

FIG. 11 is a view illustrating three examples of the index pattern of the new business system. A business system 101 illustrated in FIG. 11 has an index pattern 51 that corresponds to the elements a and e. The index pattern 51 matches the application close-monitoring necessity index patterns of the existing business systems 2, 3, and 4 in FIG. 10, and each of the business systems 2, 3, and 4 is set to "MONITORING IS NEEDED". Consequently, the new business system 101 corresponds to the case where the index pattern of the new business system matches only the pattern that needs the application close-monitoring in FIG. 7 (YES in S14_4).

Accordingly, as illustrated in FIG. 7, the monitoring server 22 temporarily registers the index pattern of the new business system 101 in the application close-monitoring necessity index pattern (FIG. 10) as the pattern set to "MONITORING IS NEEDED" (S32_1). That is, the monitoring necessity of the business system 101 in FIG. 11 is temporarily registered as "MONITORING IS NEEDED". Subsequently, the monitoring server 22 requests the management server 21 to deploy the virtual machine of the simulation system of the clone of the business system 101 with a priority "high" (S32_2). The priority is an index for effectively utilizing the limited resource pool for the simulation, and the clone of the business system having the high priority is retained in the resource pool in preference to the clone of the business system having the low priority.

Next, a business system 102 illustrated in FIG. 11 has an index pattern 52 that corresponds to the elements b and c. The index pattern 52 matches the application close-monitoring necessity index patterns of the existing business systems 1 and 5 in FIG. 10, and part of the business systems 1 and 5 is set to "MONITORING IS NEEDED" and part thereof is set to "MONITORING IS NOT NEEDED". Consequently, the new business system 102 does not correspond to the case where the index pattern of the new business system matches only the pattern that needs the application close-monitoring in FIG. 7 (NO in S14_4) or the case where the index pattern thereof matches only the pattern that does not need the application close-monitoring (NO in S14_5). Accordingly, as illustrated in FIG. 7, the monitoring server 22 temporarily registers the index pattern of the new business system 102 in the application close-monitoring necessity index pattern (FIG. 10) as the pattern set to "MONITORING IS NEEDED" (S32_4). Subsequently, the monitoring server 22 requests the management server 21 to deploy the virtual machine of the simulation system of the clone of the business system 102 with the priority "low" (S32_5).

Further, a business system 103 illustrated in FIG. 11 has an index pattern 53 that corresponds to the elements g and h. The index pattern 53 matches the application close-monitoring necessity index pattern of the existing business system 6 in FIG. 10, and the business system 6 is set to "MONITORING IS NOT NEEDED". Consequently, the new business system 103 corresponds to the case where the index pattern matches only the pattern that does not need the application close-monitoring in FIG. 7 (YES in S14_5). Accordingly, as illustrated in FIG. 7, the monitoring server 22 temporarily registers the index pattern of the new business system 103 in the application close-monitoring necessity index pattern (FIG. 10) as the pattern set to "MONITORING IS NOT NEEDED (S32_3)". Subsequently, the monitoring server 22 does not deploy the virtual machine of the simulation system of the clone of the new business system 103.

In addition, as illustrated in FIG. 7, in the case where the index pattern of the new business system does not match any of the application close-monitoring necessity index patterns of the existing business systems (NO in S14_3), the monitoring server temporarily registers the index pattern of the new business system 102 in the application close-monitoring necessity index pattern (FIG. 10) as the pattern set to "MONITORING IS NEEDED" (S32_4). Subsequently, the monitoring server 22 requests the management server 21 to deploy the virtual machine of the simulation system of the clone of the business system 102 with the priority "low" (S32_5). In the case where the index pattern does not match any of the index patterns of the existing business systems, it is not possible to use the previous necessity determination of the application close-monitoring. To cope with this, the index pattern is temporarily registered as the pattern set to "MONITORING IS NEEDED", and the clone is deployed with the priority "low" for safety.

The temporary registration of the monitoring necessity described above is performed because the application close-monitoring necessity is not determined by the client at this point. The application close-monitoring necessity is determined before the production, and hence, at the point of time of the determination, the application close-monitoring necessity is permanently registered when the prediction is correct, and the application close-monitoring necessity that is temporarily registered is changed into unnecessary when the prediction is wrong.

Next, in FIG. 7, in the case where the resource pool is fully occupied (YES in S32_6), in order to execute the simulation system deployment program and effectively use the limited capacity of the resource pool for the deployment of the simulation system, the monitoring server 22 deletes the deployed simulation system based on the priority and the least recent of the date and time of the deployment (S32_7).

For example, in the case where the clones of the new business system having the high priority and the new business system having the low priority are deployed in the resource pool for the deployment of the simulation system, the monitoring server 22 deletes the clone of the new business system having the low priority in chronological order of the date and time of the deployment to thereby create space in the resource pool. In the case where only the clone of the new business system having the high priority is deployed in the resource pool, the monitoring server 22 deletes the clone of the new business system in chronological order of the date and time of the deployment.

FIG. 12 is a view illustrating an example of a simulation system deployment management table managed by the simulation system deployment program. The monitoring server 22 maintains the deployment management table illustrated in FIG. 12, and manages the deployment of the simulation system. In the simulation system deployment management table illustrated in FIG. 12, the virtual machine ID (simulation VM ID) of the simulation system, the virtual machine ID (production VM ID) of the business system that is put into production, the business system name, the date and time of the release, and the priority of the deployment are indicated. The above-described business systems 101 and 102 are registered in the deployment management table with the high priority and the low priority respectively, and are deployed. Further, FIG. 12 illustrates that a business system 106 is newly registered with the high priority additionally.

In the case where the monitoring server 22 deletes the virtual machine of the deployed simulation system based on the priority and the least recent of the date and time of the deployment, the monitoring server 22 deletes the virtual machine from the deployment management table, and requests the management server 21 to delete the virtual machine.

Steps S32_6 and S32_7 in FIG. 7 may also be performed at the stage prior to Step S14_2.

[Application Monitoring Definition]

Figure 13:
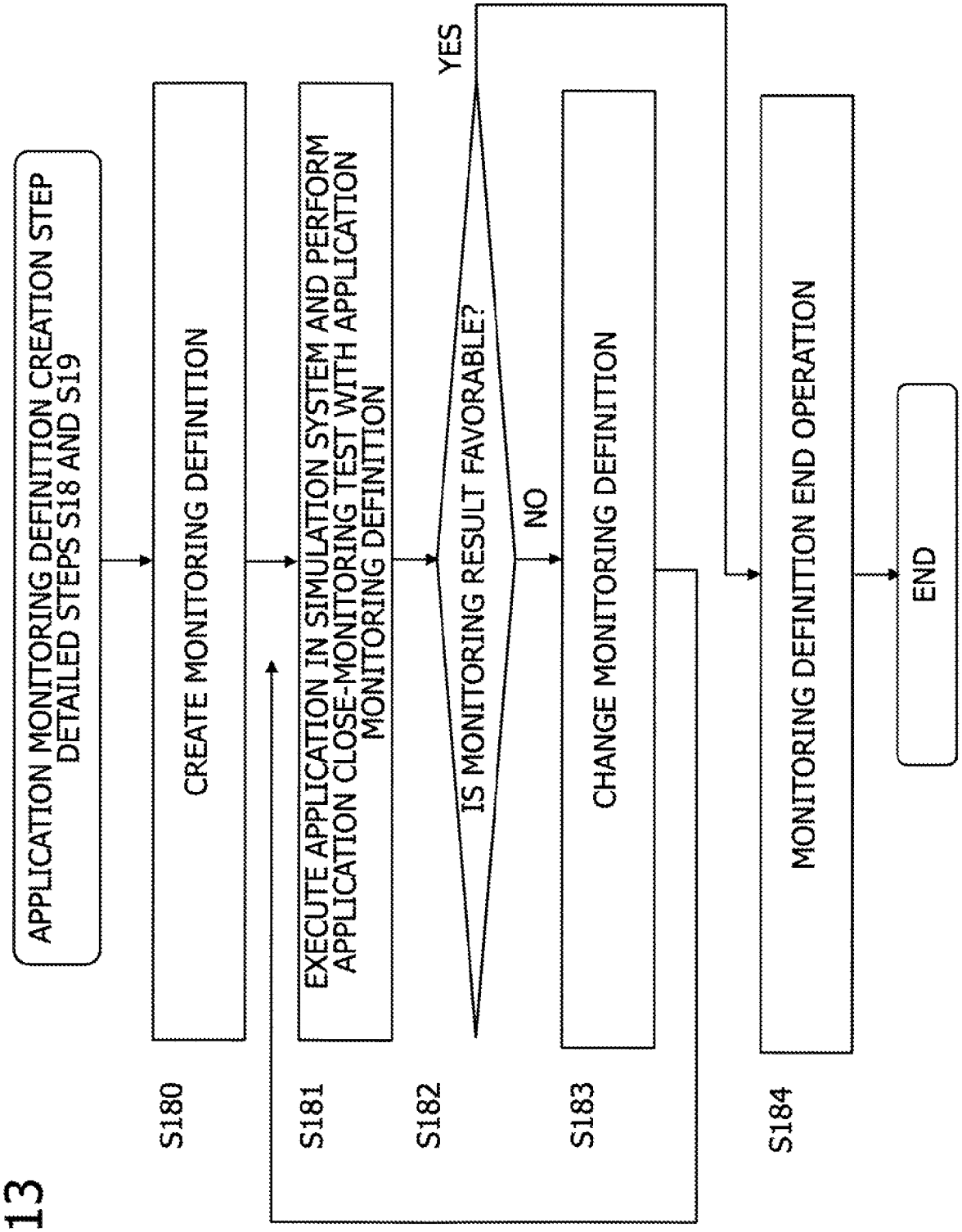
FIG. 13 is a flowchart of the application monitoring definition creation steps.

Next, the application monitoring definition creation steps S18 and S19 in FIG. 5 will be described by using specific examples. FIG. 13 is a flowchart of the application monitoring definition creation steps. Each of FIGS. 14 and 15 is a view illustrating an example of a setting screen of the application monitoring definition in the monitoring server 22.

The monitoring server 22 executes the application monitoring definition creation program PRG4 (see FIG. 4), and the cloud provider designs the application monitoring definition on an application monitoring definition screen (S180).

Figure 14:
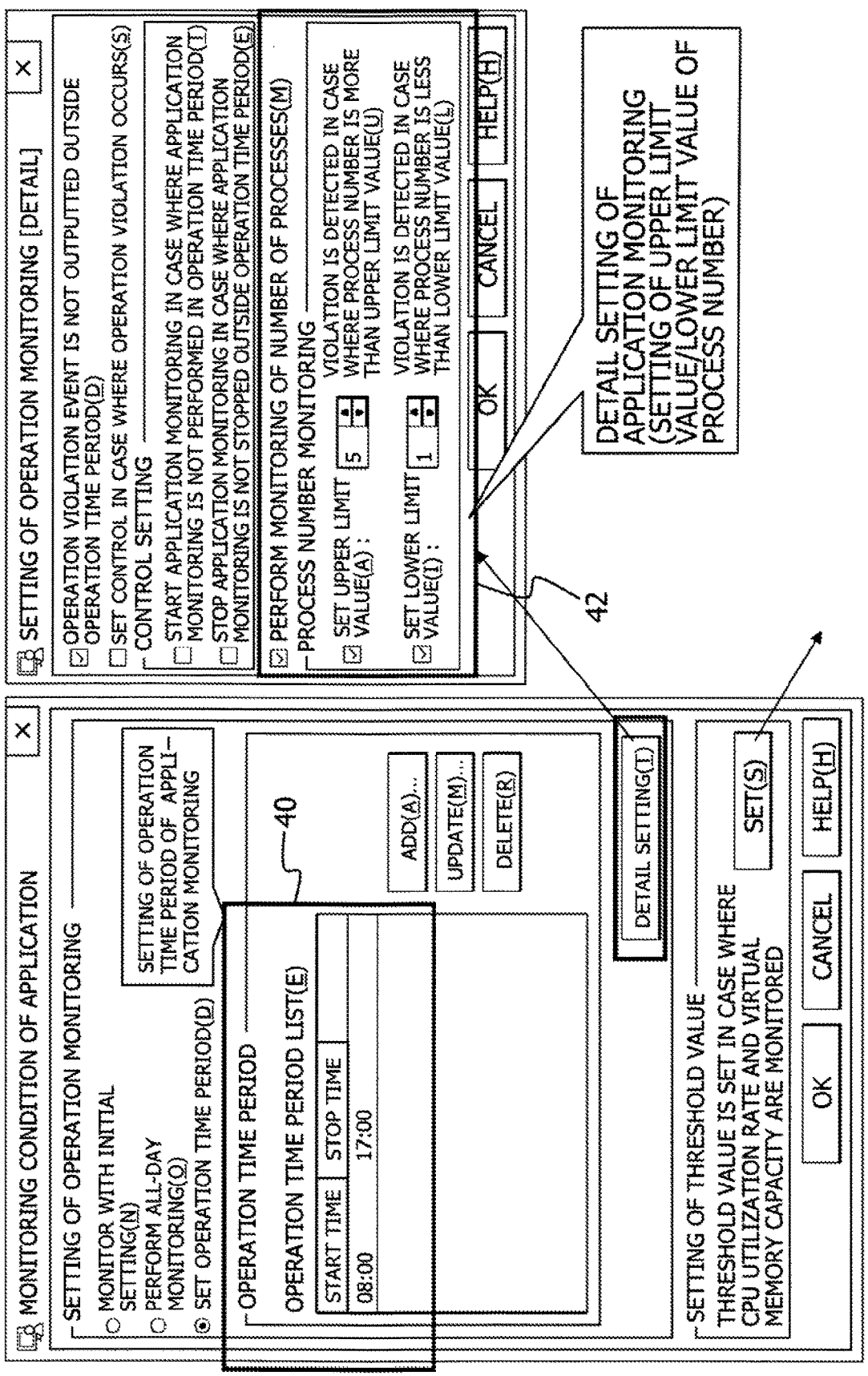
FIG. 14 is a view illustrating an example of a setting screen of the application monitoring definition in the monitoring server 22.
Figure 15:
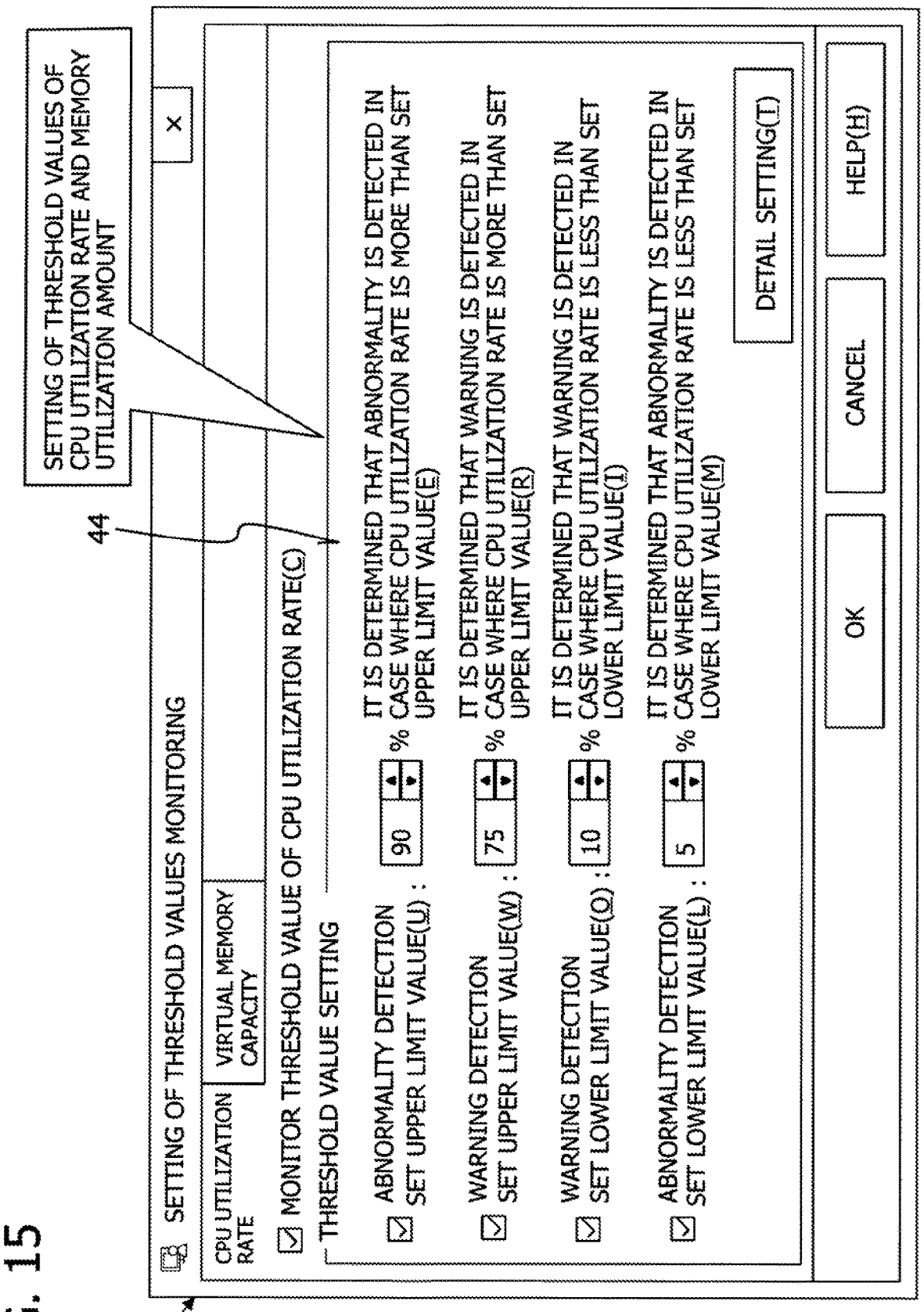
FIG. 15 is a view illustrating an example of a setting screen of the application monitoring definition in the monitoring server 22.

A screen example in FIG. 14 represents a screen 40 for setting an operation time period of the application close-monitoring. According to the screen 40, the operation time period of the application close-monitoring is set by using start time and stop time. By setting a plurality of pairs of the start time and the stop time, for example, the operation time period in the daytime and the operation time period in the nighttime may be set individually.

The screen example in FIG. 14 also represents a screen 42 for detailed setting of the application monitoring. According to the screen 42, it is possible to set the upper limit value and the lower limit value in the monitoring of the number of processes.

A screen example in FIG. 15 represents a screen 44 for setting a threshold value for monitoring of the CPU utilization rate and the memory capacity. According to the screen 44, it is possible to set the upper limit value and the lower limit value in the case where an abnormality is outputted and the upper limit value and the lower limit value in the case where the warning is outputted in a state in which the tab of the CPU utilization rate is selected. When the tab of the memory capacity is selected, a setting screen of the upper limit value and the lower limit value in the case where the abnormality or the warning of the memory capacity is outputted similar to that of the case of the CPU utilization rate is displayed.

Returning to FIG. 13, the monitoring server 22 requests the management server 21 to activate the simulation system and execute the application, and executes the application close-monitoring for the simulation system with the set application monitoring definition (S81). In the application close-monitoring, a warning message, an abnormality message that are set in the application monitoring definition and other messages are outputted.

The monitoring result (the message or the like) of the application close-monitoring is shared with the client, and it is determined whether or not the monitoring result is favorable. This determination is performed by, e.g., the cloud provider and the client of the new business system in cooperation with each other. Subsequently, when it is determined that the monitoring result is favorable (YES in S182), the cloud provider performs an application monitoring definition end operation on the application monitoring definition screen (S184). With the end operation, the simulation completion detection program PRG5 (see FIG. 4) detects the completion of the simulation.

In the case where it is determined that the monitoring result is not favorable (NO in S182), the cloud provider consults with the client and changes the setting of the monitoring definition on the application monitoring definition screen (S183). Subsequently, the monitoring server 22 performs the application close-monitoring test based on the changed application monitoring definition again (S181).

Thus, it is possible to create the appropriate application monitoring definition by repeating the application close-monitoring test while changing the setting of the monitoring definition on the application monitoring definition screen.

Second Embodiment

In a second embodiment, during the execution of the simulation system deployment program in FIG. 6, the monitoring server 22 makes a predetermined correction to the monitoring necessity determination of the index pattern extracted in Step S30 in which the application close-monitoring necessity index pattern of the existing business system is extracted.

In the correction of the application close-monitoring necessity index pattern of the existing business system, in the case where the existing business system is set to "APPLICATION CLOSE-MONITORING IS NEEDED" for an exceptional reason, the monitoring necessity of the existing business system is changed to "MONITORING IS NOT NEEDED" and, in the case where the existing business system is set to "APPLICATION CLOSE-MONITORING IS NOT NEEDED" for an exceptional reason, the monitoring necessity of the existing business system is changed to "MONITORING IS NEEDED". With this correction, it is possible to determine the monitoring necessity of the application close-monitoring necessity index pattern of the new business system based on the monitoring necessity of the existing business system without confirming if any exceptional reason exists or not.

Figure 16:
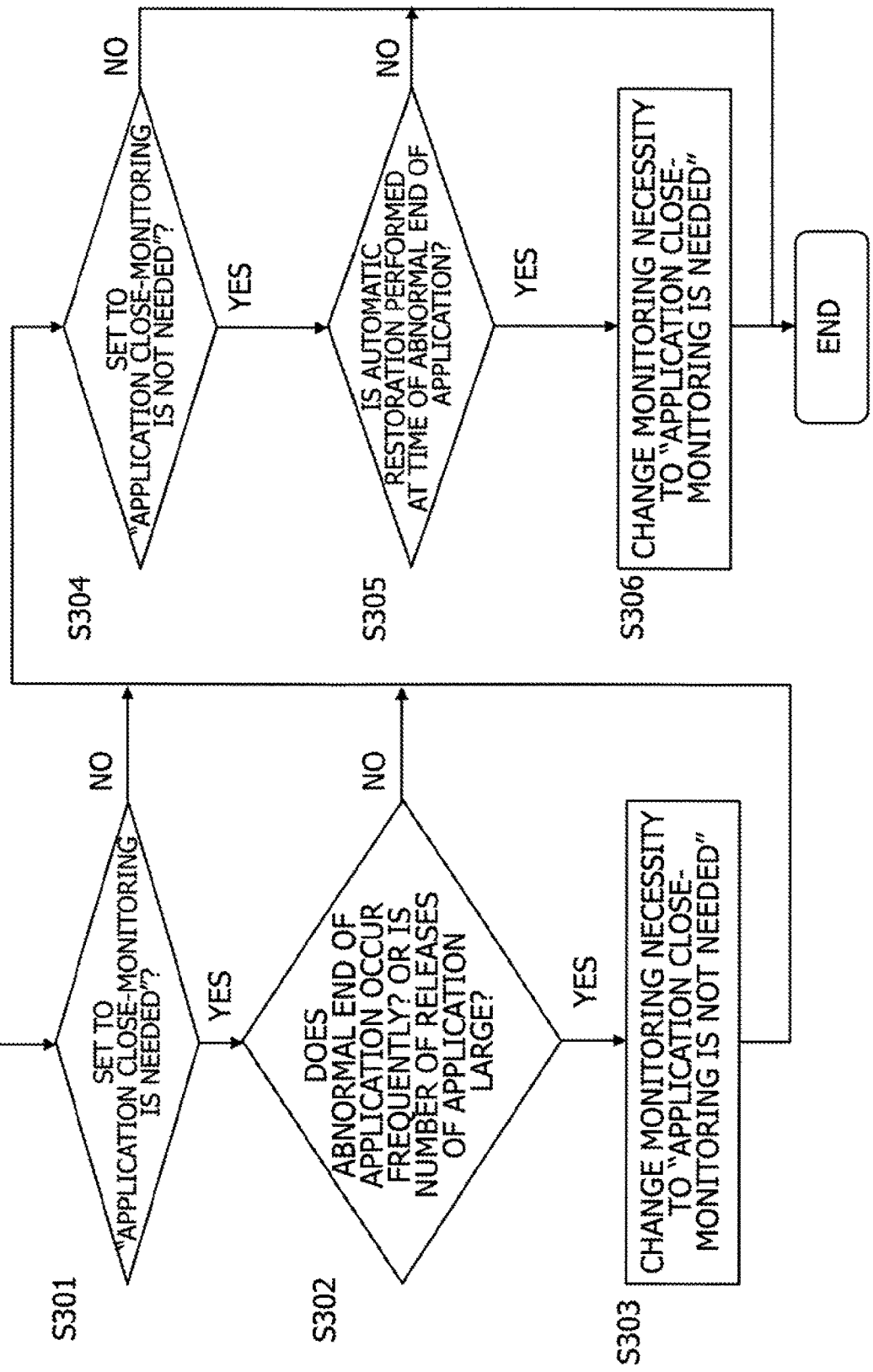
FIG. 16 is a flowchart illustrating the process in the application close-monitoring necessity correction step in Step S30.

FIG. 16 is a flowchart illustrating the process in the application close-monitoring necessity correction step in Step S30. In the case where the existing business system is set to "APPLICATION CLOSE-MONITORING IS NEEDED" (YES in S301), when there is an exceptional reason such as frequent occurrence of the abnormal end of the application or a large number of releases of the application (YES in S302), the monitoring necessity of the existing business system is changed to "APPLICATION CLOSE-MONITORING IS NOT NEEDED" (S303).

Examples of the above exceptional reason includes the frequent occurrence of the abnormal end and repetition of debug and release resulting from poor quality of the application. In the case where there is such an exceptional reason, it is considered that even when the importance of the business itself is low, since stop of the application needs to be detected early and a restart operation or the like is needed, and hence the existing business system is set to "APPLICATION CLOSE-MONITORING IS NEEDED". Consequently, the monitoring necessity is changed to "APPLICATION CLOSE-MONITORING IS NOT NEEDED" in the correction step.

In the case where the existing business system is set to "APPLICATION CLOSE-MONITORING IS NOT NEEDED" (YES in S304), when there is an exceptional reason such as execution of automatic restoration (restart) at the time of occurrence of the abnormal end of the application (YES in S305), the monitoring necessity is changed to "APPLICATION CLOSE-MONITORING IS NEEDED" (S306).

The exceptional reason described above usually needs the application close-monitoring because of high importance of the business itself or the like. However, it is considered that since the business system is automatically restored by an automatic restoration function when the abnormal end of the application occurs, and hence the business system is set to "APPLICATION CLOSE-MONITORING IS NOT NEEDED". Consequently, the monitoring necessity thereof is changed to "APPLICATION CLOSE-MONITORING IS NEEDED" in the correction step.

By providing the correction step described above, in the case where the setting of the application close-monitoring necessity of the exiting business system is made in an opposite manner to the correct necessity for the exceptional reason, it is possible to change the necessity to the correct necessity, and appropriately perform the subsequent application close-monitoring necessity determination of the new business system.

Thus, according to the present embodiment, by performing the determination of the application close-monitoring necessity of the new business system based on the determination criteria of the application close-monitoring necessity peculiar to the client, it is possible to increase the determination accuracy. Consequently, the simulation system of the clone of the new business system is deployed in advance when the application of the new business system is released and the final test thereof is started and, in the case where the request for the application close-monitoring is made from the client during the test at the final stage or immediately before the production, it is possible to create the monitoring definition in a short time period. In addition, since the determination accuracy of the monitoring necessity is high, it is possible to effectively use the limited resource pool in the deployment of the simulation system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium that stores therein a monitoring setting support program that causes a computer to execute a process comprising:
   receiving an input of first system information including a first configuration element group of a first system;
   referring to a storage that stores, for each of a plurality of second systems, a second configuration element group and monitoring setting information that is associated with the second configuration element group,
   wherein the monitoring setting information indicates if the corresponding second system is necessary to be monitored or not, the first system is before a production of the first system is newly started, and the plurality of second systems are exiting systems and belong to a same customer as the first system;
   extracting the monitoring setting information of one or more of the plurality of second systems which have a second configuration element group having predetermined similarity to the first configuration element group included in the first system information, from the storage;
   outputting the extracted monitoring setting information as monitoring setting information of the first system;
   deploying a virtual machine that constitutes a simulation system corresponding to the first system before a customer of the first system instructs to monitor the first system in a case where the extracted monitoring setting information indicates that the corresponding second system is necessary to be monitored; and
   monitoring an operation of the simulation system based on a monitoring definition when the customer of the first system instructs to monitor the first system.

2. The non-transitory computer-readable storage medium according to claim 1, wherein
   the monitoring setting information indicates if an application executed by the corresponding second system is necessary to be monitored or not.

3. The non-transitory computer-readable storage medium according to claim 2, wherein
   the monitoring the operation of the simulation system comprises:
   monitoring an operation of an application of the simulation system based on a monitoring definition.

4. The non-transitory computer-readable storage medium according to claim 3, wherein
   the process of the deploying includes, deploying the virtual machine that constitutes the simulation system corresponding to the first system with a first priority in a case where all pieces of the monitoring setting information of the one or more of the plurality of second systems indicate that the corresponding second system is necessary to be monitored, deploying the virtual machine that constitutes the simulation system corresponding to the first system with a second priority lower than the first priority in a case where part of the pieces of the monitoring setting information of the one or more of the plurality of second systems indicates that the corresponding second system is necessary to be monitored, and deleting the deployed virtual machine that constitutes the simulation system corresponding to the first system based on the priority and a time of the deployment, when newly deploying a virtual machine that constitutes a simulation system corresponding to a new third system.

5. The non-transitory computer-readable storage medium to claim 4, wherein the process of deleting includes deleting the virtual machine in ascending order of the priority and chronological order of the time of the deployment.

6. The non-transitory computer-readable storage medium according to claim 2, the process further comprising:

outputting, as monitoring setting information of the first system, monitoring setting information indicating that monitoring is necessary, the monitoring setting information of one or more of the plurality of second systems which have a second configuration element group having predetermined similarity to the first configuration element group is not extracted from the storage.

7. A method of setting supporting that supports a setting of monitoring setting information of a system, the method comprising:

receiving an input of first system information including a first configuration element group of a first system;

referring to a storage that stores, for each of a plurality of second systems, a second configuration element group and monitoring setting information that is associated with the second configuration element group, wherein the monitoring setting information indicates if the corresponding second system is necessary to be monitored or not, the first system is before a production of the first system is newly started, and the plurality of second systems are exiting systems and belong to a same customer as the first system;

extracting the monitoring setting information of one or more of the plurality of second systems which have a second configuration element group having predetermined similarity to the first configuration element group included in the first system information, from the storage;

outputting the extracted monitoring setting information as monitoring setting information of the first system;

deploying a virtual machine that constitutes a simulation system corresponding to the first system before a customer of the first system instructs to monitor the first system in a case where the extracted monitoring setting information indicates that the corresponding second system is necessary to be monitored; and monitoring an operation of the simulation system based on a monitoring definition when the customer of the first system instructs to monitor the first system.

8. A setting support device that supports a setting of monitoring setting information of a system, the setting support device comprising:

a processor; and a memory connected the processor, wherein the processor receiving an input of first system information including a first configuration element group of a first system;

referring to a storage that stores, for each of a plurality of second systems, a second configuration element group and monitoring setting information that is associated with the second configuration element group, wherein the monitoring setting information indicates if the corresponding second system is necessary to be monitored or not, the first system is before a production of the first system is newly started, and the plurality of second systems are exiting systems and belong to a same customer as the first system;

extracting the monitoring setting information of one or more of the plurality of second systems which have a second configuration element group having predetermined similarity to the first configuration element group included in the first system information, from the storage;

outputting the extracted monitoring setting information as monitoring setting information of the first system;

deploying a virtual machine that constitutes a simulation system corresponding to the first system before a customer of the first system instructs to monitor the first system in a case where the extracted monitoring setting information indicates that the corresponding second system is necessary to be monitored; and monitoring an operation of the simulation system based on a monitoring definition when the customer of the first system instructs to monitor the first system.

* * * * *